US009229091B2

(12) United States Patent
Nitta et al.

(10) Patent No.: US 9,229,091 B2
(45) Date of Patent: Jan. 5, 2016

(54) POSITIONING DEVICE, MOBILE STATION AND POSITIONING METHOD

(71) Applicant: FUJITSU LIMITED, Kawasaki-shi, Kanagawa (JP)

(72) Inventors: Daisuke Nitta, Kawasaki (JP); Satoshi Yamamoto, Fuchu (JP); Masanori Hashimoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 14/011,302

(22) Filed: Aug. 27, 2013

(65) Prior Publication Data

US 2014/0120958 A1     May 1, 2014

(30) Foreign Application Priority Data

Oct. 26, 2012   (JP) ................................ 2012-237107

(51) Int. Cl.
| | |
|---|---|
| H04W 24/00 | (2009.01) |
| G01S 5/02 | (2010.01) |
| H04W 64/00 | (2009.01) |

(52) U.S. Cl.
CPC ............. G01S 5/0252 (2013.01); H04W 64/00 (2013.01)

(58) Field of Classification Search
CPC .................................................. H04W 64/00
USPC .......... 455/456.1, 456.2, 456.3, 456.4, 456.5, 455/456.6
See application file for complete search history.

(56) References Cited

U.S. PATENT DOCUMENTS

| | | | | |
|---|---|---|---|---|
| 8,019,352 | B2* | 9/2011 | Rappaport et al. | 455/456.1 |
| 2007/0155401 | A1* | 7/2007 | Ward et al. | 455/456.1 |
| 2009/0023462 | A1* | 1/2009 | Dent | 455/456.5 |
| 2011/0163917 | A1* | 7/2011 | Lundgren et al. | 342/463 |
| 2011/0201357 | A1* | 8/2011 | Garrett et al. | 455/456.2 |
| 2011/0212733 | A1* | 9/2011 | Edge et al. | 455/456.1 |
| 2011/0306357 | A1* | 12/2011 | Alizadeh-Shabdiz et al. | 455/456.1 |
| 2011/0316748 | A1* | 12/2011 | Meyer et al. | 342/451 |

(Continued)

FOREIGN PATENT DOCUMENTS

| | | |
|---|---|---|
| JP | 10-84571 A | 3/1998 |
| JP | 2001-128222 A | 5/2001 |

(Continued)

OTHER PUBLICATIONS

Frederic Evennou and Francois Marx, "Advanced Integration of WiFi and Inertial Navigation Systems for Indoor Mobile Positioning", Hindawi Publishing Corp, EURASIP Journal on Applied Signal Processing, vol. 2006, Jan. 29, 2006.*

(Continued)

Primary Examiner — Lester Kincaid
Assistant Examiner — Andy Gu
(74) Attorney, Agent, or Firm — Arent Fox LLP

(57) ABSTRACT

A positioning device includes: a receiving unit configured to receive wireless quality information indicating wireless quality between a mobile station and a base station and information indicating a direction and an orientation of the mobile station; a determining unit configured to acquire measuring data to be used for measuring a location of the mobile station based on the direction and the orientation, from data in which each of regions as location candidates of the mobile station is associated with respective wireless quality information; and a measuring unit configured to measure the location of the mobile station based on the wireless quality information and the measuring data.

8 Claims, 20 Drawing Sheets

(56) References Cited

U.S. PATENT DOCUMENTS

| | | | |
|---|---|---|---|
| 2012/0028652 A1* | 2/2012 | Wirola et al. | 455/456.1 |
| 2012/0040696 A1* | 2/2012 | Siomina et al. | 455/456.6 |
| 2012/0066035 A1* | 3/2012 | Stanger et al. | 705/14.1 |

FOREIGN PATENT DOCUMENTS

| | | |
|---|---|---|
| JP | 2005-147747 A | 6/2005 |
| WO | 2012/066562 A2 * | 5/2012 |

OTHER PUBLICATIONS

Francescantonio Della Rosa, Mauro Pelosi, and Jari Nurmi, "Human-Induced Effects on RSS Ranging Measurements for Cooperative Positioning", Hindawi Publishing Corp, International Journal of Navigation and Observation, vol. 2012, Sep. 25, 2012.*

* cited by examiner

| DIRECTION NO. | DIRECTION OF MOBILE STATION | VALUES OF ANGULAR ACCELEROMETER | | |
|---|---|---|---|---|
| | | X | Y | Z |
| 1 | DISPLAY FACES SKY | 0.00 | 0.00 | -1.00 |
| 2 | DISPLAY FACES GROUND | 0.00 | 0.00 | +1.00 |
| 3 | RIGHT SIDE FACES SKY IN Landscape STATE | -1.00 | 0.00 | 0.00 |
| 4 | RIGHT SIDE FACES GROUND IN Landscape STATE | +1.00 | 0.00 | 0.00 |
| 5 | UPPER SIDE FACES SKY IN Portrait STATE | 0.00 | -1.00 | 0.00 |
| 6 | UPPER SIDE FACES GROUND IN Portrait STATE | 0.00 | +1.00 | 0.00 |

FIG. 6

| DIRECTION NO. | DIRECTION OF MOBILE STATION | ORIENTATION | VALUES OF GEOMAGNETIC SENSOR | | |
|---|---|---|---|---|---|
| | | | -X | -Y | -Z |
| 1 | DISPLAY FACES SKY | NORTH | | 0 DEGREE | |
| | | EAST | | 90 DEGREE | |
| | | SOUTH | | 180 DEGREE | |
| | | WEST | | 270 DEGREE | |
| 2 | DISPLAY FACES GROUND | NORTH | | 0 DEGREE | |
| | | EAST | | 90 DEGREE | |
| | | SOUTH | | 180 DEGREE | |
| | | WEST | | 270 DEGREE | |
| 3 | RIGHT SIDE FACES SKY IN LANDSCAPE STATE | NORTH | | | 0 DEGREE |
| | | EAST | | | 90 DEGREE |
| | | SOUTH | | | 180 DEGREE |
| | | WEST | | | 270 DEGREE |
| 4 | RIGHT SIDE FACES GROUND IN LANDSCAPE STATE | NORTH | | | 0 DEGREE |
| | | EAST | | | 90 DEGREE |
| | | SOUTH | | | 180 DEGREE |
| | | WEST | | | 270 DEGREE |
| 5 | UPPER SIDE FACES SKY IN PORTRAIT STATE | NORTH | | | 0 DEGREE |
| | | EAST | | | 90 DEGREE |
| | | SOUTH | | | 180 DEGREE |
| | | WEST | | | 270 DEGREE |
| 6 | UPPER SIDE FACES GROUND IN PORTRAIT STATE | NORTH | | | 0 DEGREE |
| | | EAST | | | 90 DEGREE |
| | | SOUTH | | | 180 DEGREE |
| | | WEST | | | 270 DEGREE |

FIG. 7

|  | 0m | 5m | 10m | 15m | 20m | 25m |
|---|---|---|---|---|---|---|
| 0m | a1 | b1 | c1 | d1 | e1 | ~A1 |
| 5m | a2 | b2 | c2 | d2 | e2 | |
| 10m | a3 | b3 | c3 | d3 | e3 | |
| 15m | a4 | b4 | c4 | d4 | e4 | |
| 20m | a5 | b5 | c5 | d5 | e5 | |
| 25m | | | | | | |

FIG. 9

| MESH ID | DIRECTION NO. | DIRECTION OF MOBILE STATION | WIRELESS QUALITY INFORMATION ||||||||
|---|---|---|---|---|---|---|---|---|---|---|
| | | | BASE STATION INFORMATION B1 ||||| BASE STATION INFORMATION B2 | ... | BASE STATION INFORMATION Bn |
| | | | ORIENTATION | BASE STATION ID | TIME t1 | TIME t2 | TIME t3 | | | |
| a1 | 1 | DISPLAY FACES SKY | NORTH | C1 | -105dBm | -110dBm | -115dBm | ... | ... | ... |
| | | | EAST | C1 | -105dBm | -105dBm | -105dBm | ... | ... | ... |
| | | | SOUTH | C2 | -120dBm | -110dBm | -115dBm | ... | ... | ... |
| | | | WEST | C3 | -105dBm | -105dBm | -105dBm | ... | ... | ... |
| | 2 | DISPLAY FACES GROUND | | | | | | ... | ... | ... |
| | 3 | RIGHT SIDE FACES SKY IN Landscape STATE | | | | | | ... | ... | ... |
| | 4 | RIGHT SIDE FACES GROUND IN Landscape STATE | | | | | | ... | ... | ... |
| | 5 | UPPER SIDE FACES SKY IN Portrait STATE | | | | | | ... | ... | ... |
| | 6 | UPPER SIDE FACES GROUND IN Portrait STATE | | | | | | ... | ... | ... |

| MESH ID | DIRECTION NO. | DIRECTION OF MOBILE STATION | ORIENTATION | WIRELESS QUALITY INFORMATION ||||||
|---|---|---|---|---|---|---|---|---|---|
| | | | | BASE STATION INFORMATION B1 |||| BASE STATION INFORMATION B2 | ... | BASE STATION INFORMATION Bn |
| | | | | BASE STATION ID | AVERAGE VALUE | WIRELESS STABILITY (STANDARD DEVIATION) | | | | |
| a1 | 1 | DISPLAY FACES SKY | NORTH | C1 | -110dBm | 5 | | ... | ... | ... |
| | | | EAST | C1 | -105dBm | 0 | | ... | ... | ... |
| | | | SOUTH | C2 | -115dBm | 2.5 | | ... | ... | ... |
| | | | WEST | C3 | -105dBm | 0 | | ... | ... | ... |
| | 2 | DISPLAY FACES GROUND | | | | | | ... | ... | ... |
| | 3 | RIGHT SIDE FACES SKY IN LANDSCAPE STATE | | | | | | | | |
| | 4 | RIGHT SIDE FACES GROUND IN LANDSCAPE STATE | | | | | | ... | ... | ... |
| | 5 | UPPER SIDE FACES SKY IN PORTRAIT STATE | | | | | | ... | ... | ... |
| | 6 | UPPER SIDE FACES GROUND IN PORTRAIT STATE | | | | | | ... | ... | ... |

| MESH ID | DIRECTION NO. | DIRECTION OF MOBILE STATION | WIRELESS QUALITY INFORMATION ||||||
|---|---|---|---|---|---|---|---|---|
| | | | BASE STATION INFORMATION B1 |||| BASE STATION INFORMATION B2 | ... | BASE STATION INFORMATION Bn |
| | | | BASE STATION ID | AVERAGE VALUE | WIRELESS STABILITY (STANDARD DEVIATION) | | | |
| a1 | 1 | DISPLAY FACES SKY | C1 | -110dBm | 5 | ... | ... | ... |
| | | | C1 | -105dBm | 0 | | | |
| | | | C2 | -115dBm | 2.5 | | | |
| | | | C3 | -105dBm | 0 | | | |
| | 2 | DISPLAY FACES GROUND | ... | | | ... | ... | ... |
| | 3 | RIGHT SIDE FACES SKY IN LANDSCAPE STATE | ... | | | ... | ... | ... |
| | 4 | RIGHT SIDE FACES GROUND IN LANDSCAPE STATE | ... | | | ... | ... | ... |
| | 5 | UPPER SIDE FACES SKY IN PORTRAIT STATE | ... | | | ... | ... | ... |
| | 6 | UPPER SIDE FACES GROUND IN PORTRAIT STATE | ... | | | ... | ... | ... |

FIG. 13

| MOBILE STATION ID | 001 | | | | | INFORMATION β | TIME t1~t3 | INFORMATION γ | TIME t1~t3 | F3 |
|---|---|---|---|---|---|---|---|---|---|---|
| MEASURED ITEM | INFORMATION α | TIME t1 | TIME t2 | TIME t3 | | | | | | |
| WIRELESS QUALITY INFORMATION | C1 | -105dBm | -110dBm | -115dBm | | C2 | ... | C3 | ... | |
| ANGULAR ACCELEROMETER | Z | -1.00 | -1.00 | -1.00 | | X | ... | Y | ... | |
| GEOMAGNETIC SENSOR | Y | 0 DEGREE | 0 DEGREE | 0 DEGREE | | X | ... | Z | ... | |
| PROXIMITY SENSOR | STATUS | ABSENCE | ABSENCE | ABSENCE | | | | | | |
| ILLUMINATION SENSOR | STATUS | BRIGHT | BRIGHT | BRIGHT | | | | | | |

FIG. 14

| MOBILE STATION ID | 001 | | | | | | | |
|---|---|---|---|---|---|---|---|---|
| DIRECTION | DIRECTION NO. 1: DISPLAY FACES SKY | | | | | | | |
| ORIENTATION | NORTH | | | | | | | |
| MEASURED ITEM | INFORMATION α | TIME t1 | TIME t2 | TIME t3 | INFORMATION β | TIME t1~t3 | INFORMATION γ | TIME t1~t3 |
| WIRELESS QUALITY INFORMATION | C1 | -105dBm | -110dBm | -115dBm | C2 | ... | C3 | ... |
| WIRELESS QUALITY INFORMATION | Z | -1.00 | -1.00 | -1.00 | X | ... | Y | ... |
| ANGULAR ACCELEROMETER | Y | 0 DEGREE | 0 DEGREE | 0 DEGREE | X | | Z | |
| GEOMAGNETIC SENSOR | STATUS | ABSENCE | ABSENCE | ABSENCE | | | | |
| PROXIMITY SENSOR | STATUS | BRIGHT | BRIGHT | BRIGHT | | | | |

| | | | | | | | |
|---|---|---|---|---|---|---|---|
| MOBILE STATION ID | 001 | | | | | | |
| DIRECTION | DIRECTION NO. 1: DISPLAY FACES SKY | | | | | | |
| ORIENTATION | NORTH | | | | | | |
| WIRELESS STABILITY | 5 (USE) | | | | | | |
| AVERAGE VALUE OF WIRELESS QUALITY INFORMATION | -110dBm | | | | | | |
| MEASURED ITEM | INFORMATION α | TIME t1 | TIME t2 | TIME t3 | INFORMATION β | TIME t1~t3 | INFORMATION γ | TIME t1~t3 |
| WIRELESS QUALITY INFORMATION | C1 | -105dBm | -110dBm | -115dBm | C2 | ⋯ | C3 | ⋯ |
| ANGULAR ACCELEROMETER | Z | -1.00 | -1.00 | -1.00 | X | ⋯ | Y | ⋯ |
| GEOMAGNETIC SENSOR | Y | 0 DEGREE | 0 DEGREE | 0 DEGREE | X | ⋯ | Z | ⋯ |
| PROXIMITY SENSOR | STATUS | ABSENCE | ABSENCE | ABSENCE | | | | |
| ILLUMINATION SENSOR | STATUS | BRIGHT | BRIGHT | BRIGHT | | | | |

| | SITUATION NO. | DIRECTION NO. | DIRECTION | ANGULAR ACCELEROMETER | PROXIMITY SENSOR | ILLUMINATION SENSOR | WIRELESS PROPAGATION LOSS VALUE |
|---|---|---|---|---|---|---|---|
| 1 | USER IS ON THE PHONE | 5 | UPPER SIDE FACES SKY IN PORTRAIT STATE | NOT 0 | PRESENCE | BRIGHT OR DARK | 10dB |
| 2 | USER IS MANIPULATING | 1 | DISPLAY FACES SKY | NOT 0 | ABSENCE | BRIGHT | 5dB |
| 3 | ON DESK (MOBILE STATION FACES UPWARDLY) | 1 | DISPLAY FACES SKY | 0 | ABSENCE | BRIGHT | 0dB |
| 4 | ON DESK (MOBILE STATION FACES DOWNWARDLY) | 2 | DISPLAY FACES GROUND | 0 | ABSENCE | DARK | 0dB |
| 5 | IN BAG | 3 or 4 | RIGHT SIDE FACES SKY OR GROUND IN LANDSCAPE STATE | NOT 0 | PRESENCE | DARK | 15dB |
| 6 | IN POCKET | 5 or 6 | UPPER SIDE FACES SKY OR GROUND IN PORTRAIT STATE | NOT 0 | PRESENCE | DARK | 10dB |

FIG. 18

| MOBILE STATION ID | 001 | | | | | | |
|---|---|---|---|---|---|---|---|
| DIRECTION | DIRECTION NO. 1: DISPLAY FACES SKY | | | | | | |
| ORIENTATION | NORTH | | | | | | |
| WIRELESS STABILITY | 5 (USE) | | | | | | |
| AVERAGE VALUE OF WIRELESS QUALITY INFORMATION | -110 DBM (WIRELESS PROPAGATION LOSS VALUE DUE TO SITUATION IS 0 DB) | | | | | | |
| SITUATION NO. | 3 | | | | | | |
| MEASURED ITEM | INFORMATION α | TIME t1 | TIME t2 | TIME t3 | INFORMATION β | TIME t1~t3 | INFORMATION γ | TIME t1~t3 |
| WIRELESS QUALITY INFORMATION | C1 | -105dBm | -110dBm | -115dBm | C2 | ... | C3 | ... |
| ANGULAR ACCELEROMETER | Z | -1.00 | -1.00 | -1.00 | X | ... | Y | ... |
| GEOMAGNETIC SENSOR | Y | 0 DEGREE | 0 DEGREE | 0 DEGREE | X | ... | Z | ... |
| PROXIMITY SENSOR | STATUS | ABSENCE | ABSENCE | ABSENCE | | | | |
| ILLUMINATION SENSOR | STATUS | BRIGHT | BRIGHT | BRIGHT | | | | |

| MESH ID | DIRECTION NO. | DIRECTION OF MOBILE STATION | ORIENTATION | WIRELESS QUALITY INFORMATION | | | | |
|---|---|---|---|---|---|---|---|---|
| | | | | BASE STATION INFORMATION B1 | | | BASE STATION INFORMATION B2 | ... | BASE STATION INFORMATION Bn |
| | | | | BASE STATION ID | AVERAGE VALUE | WIRELESS STABILITY (STANDARD DEVIATION) | | | |
| a1 | 1 | DISPLAY FACES SKY | NORTH | C1 | -110dBm | 5 | ... | ... | ... |
| ... | | | | | | | | | |
| e5 | | | | | | | | | |

POSITIONING DEVICE, MOBILE STATION AND POSITIONING METHOD

CROSS-REFERENCE TO RELATED APPLICATION

This application is based upon and claims the benefit of priority of the prior Japanese Patent Application No. 2012-237107, filed on Oct. 26, 2012, the entire contents of which are incorporated herein by reference.

FIELD

The embodiments discussed herein are related to a positioning device, a mobile station and a positioning method.

BACKGROUND

As high-quality and high-speed wireless communications in indoor environments has become important, femto base stations are being widely used as small-sized base stations installed in indoor areas of commercial facilities, office buildings or the like. In particular, as long Term Evolution (LTE) has been recently introduced as a new air interface replacing Wideband-Code Division Multiple Access (W-CDMA), LTE femto base stations are anticipated to be widely used. Meanwhile, as high-performance multi-functional mobile stations such as smart phones have become prevalent, various services using location information of the mobile stations are being provided. However, in indoor environments. Global Positioning System (GPS) is out of service and the sensitivity of a geomagnetic sensor is low. For this reason, in order to provide such a service using location information of a mobile station to a user in an indoor area, it is effective that a mobile station measures a location thereof (i.e., performs a positioning) by using a radio signal from a femto base station. Typical indoor positioning techniques include RF (Radio Frequency) pattern matching, which may be referred as RF fingerprint, and multi-point positioning such as three-point positioning, for example.

Related art is disclosed in Japanese Laid-open Patent Publication No. 10-84571, Japanese Laid-open Patent Publication No. 2001-428222, and Japanese Laid-open Patent Publication No. 2005-147747.

However, since all the aforementioned positioning techniques mainly use wireless quality information between a mobile station and a femto base station to measure a location of the mobile station, they have the following problem. In the positioning techniques, wireless quality information (e.g., Reference Signal Received Power (RSRP) or Reference Signal Received Quality (RSRQ)) acquired from a mobile station, which is a positioning target, is mainly used. Therefore, when measuring a location of the mobile station, an installation situation of the mobile station (e.g., a direction of the mobile station or whether the mobile station is in contact with other object) or a surrounding environment of the mobile station (e.g. a degree of loss in wireless propagation) is not considered, whereby implementation of accurate positioning of the mobile station being impeded. This problem is particularly significant when the mobile station is in contact with another object (e.g., when the user brings the mobile station into contact with their ear for a voice call) or when there is a shielding object in the vicinity of the mobile station (e.g., when the user carries the mobile station in a bag).

SUMMARY

According to an aspect of the embodiments, a positioning device includes: a receiving unit configured to receive wireless quality information indicating wireless quality between a mobile station and a base station and information indicating a direction and an orientation of the mobile station; a determining unit configured to acquire measuring data to be used for measuring a location of the mobile station based on the direction and the orientation, from data in which each of regions as location candidates of the mobile station is associated with respective wireless quality information; and a measuring unit configured to measure the location of the mobile station based on the wireless quality information and the measuring data.

The object and advantages of the disclosure will be realized and attained by means of the elements and combinations particularly pointed, out in the claims.

It is to be understood that both the foregoing general description and the following detailed description are exemplary and explanatory and are not restrictive of the disclosure.

BRIEF DESCRIPTION OF DRAWINGS

FIG. 6 illustrates corresponding relationships between directions and orientations of the mobile station and values of geomagnetic sensors.
FIG. 7 illustrates an example of mesh IDs given to a target area.
FIG. 9 illustrates a format of data provided from a mobile station to a positioning device.
FIG. 10 illustrates average values of wireless quality information of data provided from a mobile station to a positioning device and wireless stability.
FIG. 11 illustrates an RF pattern stored in a RF pattern matching DB of a positioning device.
FIG. 13 illustrates a format of data collected by a mobile station at a start of positioning.
FIG. 14 illustrates a format of collected data after directions and orientations of a mobile station are determined.
FIG. 16 illustrates a format of collected data after a determination process as to whether wireless stability is required to be used is executed.
FIG. 17 illustrates an example of storing data in a reference table to assist in determining the situation of a mobile station.
FIG. 18 illustrates a format of collected data after determining the situation.
FIG. 19 illustrates an RF pattern as a matching target with wireless quality information of a mobile station.

DESCRIPTION OF EMBODIMENTS

Hereinafter, embodiments of a positioning device, a mobile station and a positioning method disclosed in the present disclosure will be described in detail with reference to the drawings. Further, the positioning device, the mobile station and the positioning method disclosed in the present disclosure are not limited to the following embodiments.

Figure 1:
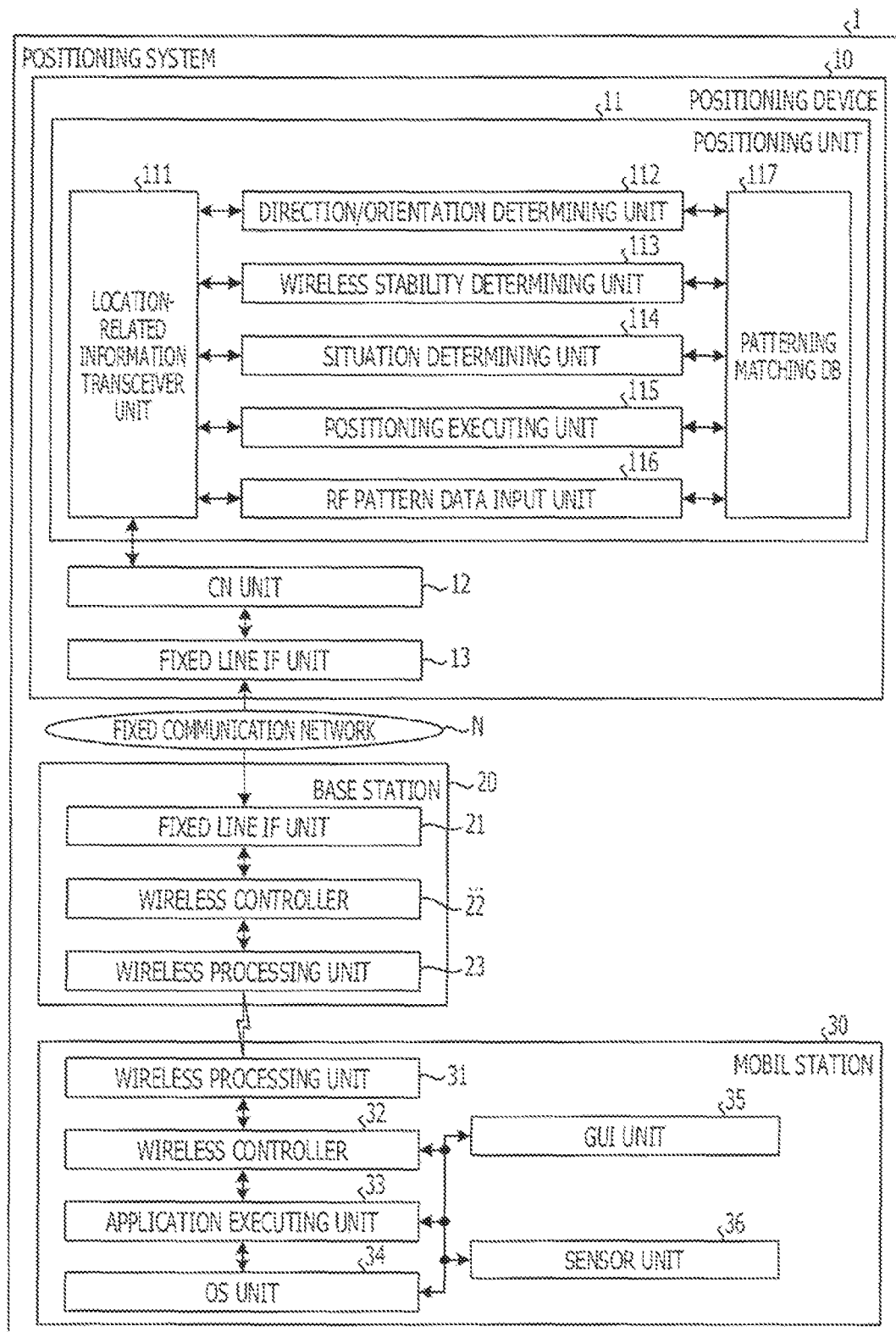
FIG. 1 illustrates a functional configuration of a positioning system.

The configuration of a positioning system according to an embodiment disclosed in the present disclosure will be described below. FIG. 1 illustrates a functional configuration of a positioning system. As illustrated in FIG. 1, the positioning system 1 includes a positioning device 10, a base station 20 and a mobile station 30. The positioning device 10 is installed in a station building or an office of a mobile operator and wired-connected to the base station 20 via a fixed communication network N. The fixed communication network N is a network for connecting the positioning device 10 and the base station 20. For example, the fixed communication network N is a wide area Ethernet™ network or an optical fiber network. Further, the base station 20 is wirelessly connected to the mobile station 30.

The positioning device 10 includes a positioning unit 11, a CN (core network) unit 12 and a fixed line IF (interface) unit 13. The positioning unit 11 measures a location of the mobile station 30 based on location-related information collected from the mobile station 30, and feeds-back the measurement results to the mobile station 30. Further, the positioning unit 11 generates an RF pattern matching DB (database) 117 to be referred to when performing a positioning of the mobile station 30. The positioning unit 11 includes a location-related information transceiver unit 111, a direction/orientation determining unit 112, a wireless stability determining unit 113, a situation determining unit 114, a positioning executing unit 115, an RF pattern data input unit 116 and the RF pattern matching DB 117. The respective components are coupled to each other such that unidirectional or bidirectional input/output of a signal or data is allowed.

The location-related information transceiver unit 111 receives location-related information collected by the mobile station 30 and outputs the location-related information to the direction/orientation determining unit 112, the wireless stability determining unit 113, the situation determining unit 114 and the positioning executing unit 115. Further, the location-related information transceiver unit 111 receives positioning results of the mobile station 30 from the positioning executing unit 115 and transmits the positioning results to the mobile station 30. The direction/orientation determining unit 112 determines a current direction and orientation of the mobile station 30 based on angular accelerometer information and geomagnetic sensor information obtained by the mobile station 30. In addition, the direction/orientation determining unit 112 specifies, among RF patterns stored in the RF pattern matching DB 117, an RF pattern to be used for positioning based on the determination results.

The wireless stability determining unit 113 determines whether to use stability of a wireless line (wireless stability) around the mobile station 30 for the purpose of positioning the mobile station 30 on the basis of the angular accelerometer information and variation of wireless quality information for a certain time obtained by the mobile station 30. The situation determining unit 114 determines a current situation of the mobile station 30 on the basis of the angular accelerometer information, proximity sensor information and illumination sensor information obtained by the mobile station 30. In addition, the situation determining unit 114 subtracts a wireless propagation loss value corresponding to the situation of the mobile station 30 from an average value of wireless quality information registered with the RF pattern matching DB 117. Thus, the RF pattern in the RF pattern matching DB 117 is corrected into a value reflecting the wireless propagation loss between the mobile station 30 and the base station 20.

The positioning executing unit 115 specifies, by using a least square method, a mesh ID which minimizes a difference between the wireless quality information of the mobile station 30 as a transmission source of data received by the location-related information transceiver unit 111 and the wireless quality information registered in advance with the RF pattern matching DB 117, thereby measuring a current location of the mobile station 30. The RF pattern data input unit 116 calculates wireless stability by using the wireless quality information of the mobile station 30 as a transmission source of the data received by the location-related information transceiver unit 111 and the angular accelerometer information. Further, the RF pattern data input unit 116 associates values indicating the wireless quality information of the mobile station 30 with the wireless stability to the mesh ID and stores the associated values, wireless stability and mesh ID in the RF pattern matching DB 117.

The RF pattern matching DB 117 stores information input from the RF pattern data input unit 116. Further, the RF pattern matching DB 117 executes an updating process or a masking process on the RF pattern stored in the RF pattern matching DB 117 according to requests from the direction/orientation determining unit 112, the wireless stability determining unit 113 and the situation determining unit 114. Furthermore, when a positioning request is input from the positioning executing unit 115, the RF pattern matching DB 117 provides location information (e.g., the mesh ID) to be provided to the mobile station 30, to the positioning executing unit 115.

The CN unit 12 corresponds to an EPC (Evolved Packet Core) node in LTE. The CN unit 12 is a terminating unit of a wireless communication network and has a terminating function or an authentication function of a mobile-related protocol. The fixed line IF unit 13 serves as a line interface for coupling the positioning device 10 and the base station 20.

Next the configuration of the base station 20 will be described. The base station 20 is, for example, a femto base station which can easily perform a positioning process in an indoor environment but it may also be a micro base station, a macro base station or the like. The base station 20 includes a fixed line IF (interface) unit 21, a wireless controller 22 and a wireless processing unit 23. These respective components are coupled to each other such that unidirectional or bidirectional input/output of a signal or data is allowed. The fixed line IF unit 21 serves as a line interface for coupling the base station 20 and the positioning device 10 via Ethernet™ or optical fiber. The wireless controller 22 controls wireless communication between the mobile station 30 and the base station 20. The wireless controller 22 also controls communication connections (sessions), communication channels (transport channels) and the like according to an Radio Resource Control (RRC) protocol of the $3^{rd}$ Generation Partnership Project (3GPP). The wireless processing unit 23 transmits to and receives from the mobile station 30 a radio signal by using a physical channel according to a communication protocol standardized by the 3GPP.

Next, the configuration of the mobile station 30 will be described. The mobile station 30 may be a terminal used by a user to perform various types of communications such as data communication via the internet network, voice communication via a public switched network or a mobile communication network and the like. The mobile station 30 includes a wireless processing unit 31, a wireless controller 32, an application executing unit 33, an Operating System (OS) unit 34, a Graphical User Interface (GUI) unit 35 and a sensor unit 36. These respective components are coupled to each other such that unidirectional or bidirectional input/output of a signal or data is allowed.

The wireless processing unit 31 performs wireless communication between the base station 20 and the mobile station 30. The wireless processing unit 31 transmits to and receives from the base station 20 a radio signal by using a physical channel based on a communication protocol standardized by the 3GPP. In order to secure a stable communication path, the mobile station 30 collects wireless quality information from a plurality of base stations including the base station 20. The wireless controller 32 controls wireless communication between the mobile station 30 and the base station 20. The wireless controller 32 controls communication connections (sessions), communication channels (transport channels) and the like based on communication protocols standardized by the 3GPP. The wireless controller 32 receives the wireless quality information of each base station from the wireless processing unit 31 and transmits the wireless quality information to the OS unit 34.

The application executing unit 33 has three main functions including: a function of pre-registrating a wireless quality information; a function of positioning; and a function of displaying positioning result. In the function of pre-registrating, the application executing unit 33 collects, via a standard Application Program Interface (API) of the OS unit 34 in response to a manipulation of the GUI unit 35, various types of sensor information obtained by the sensor unit 36 and the wireless quality information obtained by the wireless controller 32 to create the foregoing RF pattern matching DB 117. For example, a total of twenty-four patterns of six directions (±X, ±Y and ±Z)×four orientations (north, south, east and west) are collected at every mesh, and the collected information is transmitted by the wireless processing unit 31 to the positioning device 10. In the function of positioning, the application executing unit 33 collects, via the standard API of the OS unit 34, various types of sensor information obtained by the sensor unit 36 and the wireless quality information obtained by the wireless controller 32 to measure a current location of the mobile station 30. This type of information is transmitted by the wireless processing unit 31 to the positioning device 10 to be used for positioning. In the function of displaying, the application executing unit 33 displays a mesh ID specified by the positioning executing unit 115 on the GUI unit 35, as positioning results.

The OS unit 34 provides various types of information, for example, the sensor information obtained by the sensor unit 36 and the wireless quality information obtained by the wireless controller 32, to the application executing unit 33. Further, the OS unit 34 has a function for allowing the application executing unit 33 to operate the GUI unit 35. The OS unit 34 is implemented by, for example, an OS for smart phones, such as Android®, iOS®, Windows-Phone® or the like. The GUI unit 35 may be an interface for connecting a user of the mobile station 30 and the application executing unit 33, and may provide a display unit such as a display and an input unit such as a keyboard or a touch panel.

The sensor unit 36 includes a sensor, for example, an angular accelerometer, a geomagnetic sensor, a proximity sensor or an illumination sensor, and provides measurement result of the sensor to the OS unit 34. The sensor unit 36 may include ail these sensors. The angular accelerometer detects, for example, whether the mobile station 30 moves or a direction of the mobile station 30. The geomagnetic sensor detects, for example, an orientation of the mobile station 30, for example, one orientation selected from north, south, east and west. The proximity sensor detects, for example, whether an object (including people) exists around the mobile station 30. The proximity sensor may also detect a position of an object or a distance from the mobile station 30 to an object, as well as the presence or absence of an object. The illumination sensor may detect, for example, so intensity of illumination around the mobile station 30, and determines whether the perimeter of the mobile station 30 is bright by comparing the intensity of illumination and a threshold value.

Figure 2:
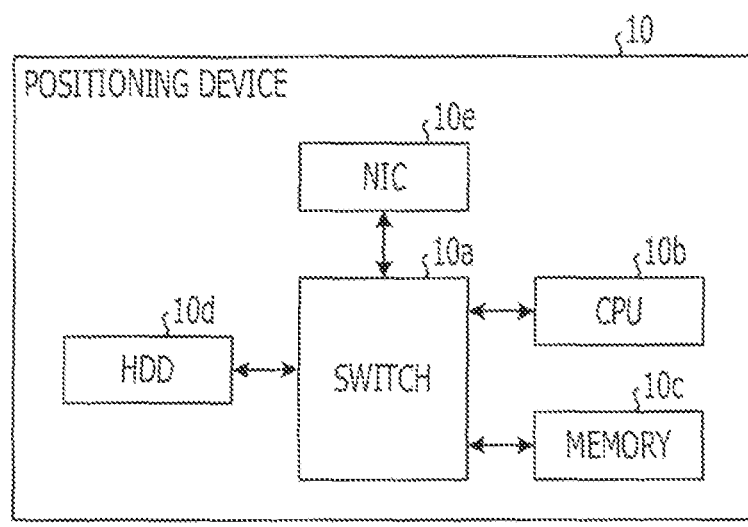
FIG. 2 illustrates a hardware configuration of a positioning device.

Next, hardware configurations of the positioning device 10 and the mobile station 30 will be described. FIG. 2 illustrates a hardware configuration of a positioning device. As illustrated in FIG. 2, the positioning device, for example, the positioning device 10 illustrated in FIG. 1, includes a switch 10a. A CPU (Central Processing Unit) 10b, a memory 10c such as an Synchronous Dynamic Random Access Memory (SDRAM), an Hard Disk Drive (HDD) 10d and an Network Interface Card (NIC) 10e are coupled via the switch 10a such that input and output of various signals and data with each other are allowed. The position-related information transceiver unit 111 is implemented by, for example, the NIC 10e, the CPU 10b and the memory 10c. The direction/orientation determining unit 112, the wireless stability determining unit 113, the situation determining unit 114, the positioning executing unit 115 and the RF pattern data input unit 116 are implemented by, for example, the CPU 10b and the memory 10c. The RF pattern matching DB 117 is implemented by, for example, the HDD 10d or the memory 10c. The CN unit 12 and the fixed line IF unit 13 are implemented by, for example, the NIC 10e.

Figure 3:
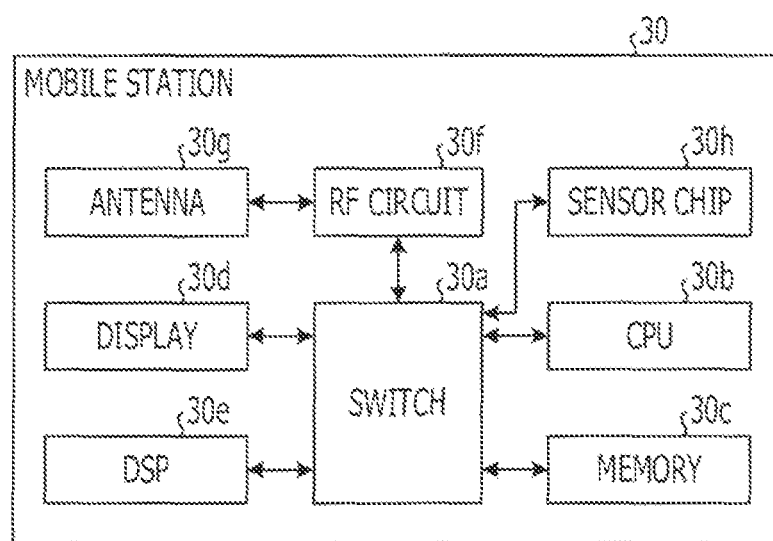
FIG. 3 illustrates a hardware configuration of a mobile station.

FIG. 3 illustrates a hardware configuration of a mobile station. As illustrated in FIG. 3, the mobile station, for example, the mobile station 30 illustrated in FIG. 1, includes a switch 30a. A CPU 30b, a memory 30c, a display 30d, a Digital Signal Processor (DSP) 30e, a Radio Frequency (RF) circuit 30f and a sensor chip 30b are coupled via the switch 30a such that input and output of various signals or data with each other are allowed. Further, the RF circuit 30f has an antenna 30g. The wireless processing unit 31 of the mobile station 30 is implemented by, for example, the RF circuit 30f. The wireless controller 32 is implemented by, for example, the DSP 30e. The application executing unit 33 and the OS unit 34 are implemented by, for example, the CPU 30b and the memory 30c such as a flash memory or an SDRAM. The GUI unit 35 is implemented by, for example, the display 30d such as an liquid Crystal Display (LCD) or an Electro-Luminescence (EL). The sensor unit 36 is implemented by, for example, the sensor chip 30h. The sensor chip 30h includes, for example, an Integrated Circuit (IC) capable of detecting an angular acceleration, a geomagnetic direction, the presence or absence of an adjacent object, a position of the adjacent object, a distance to the adjacent object, an intensity of illumination or the like.

Next, the operation of the positioning system 1 according to the present embodiment will be described. In the following description, the operations of the positioning system 1 will be described by dividing them into an operation of generating the RF pattern matching DB 117 as preprocessing and an operation of measuring a current location of the mobile station 30 as positioning.

Figure 4:
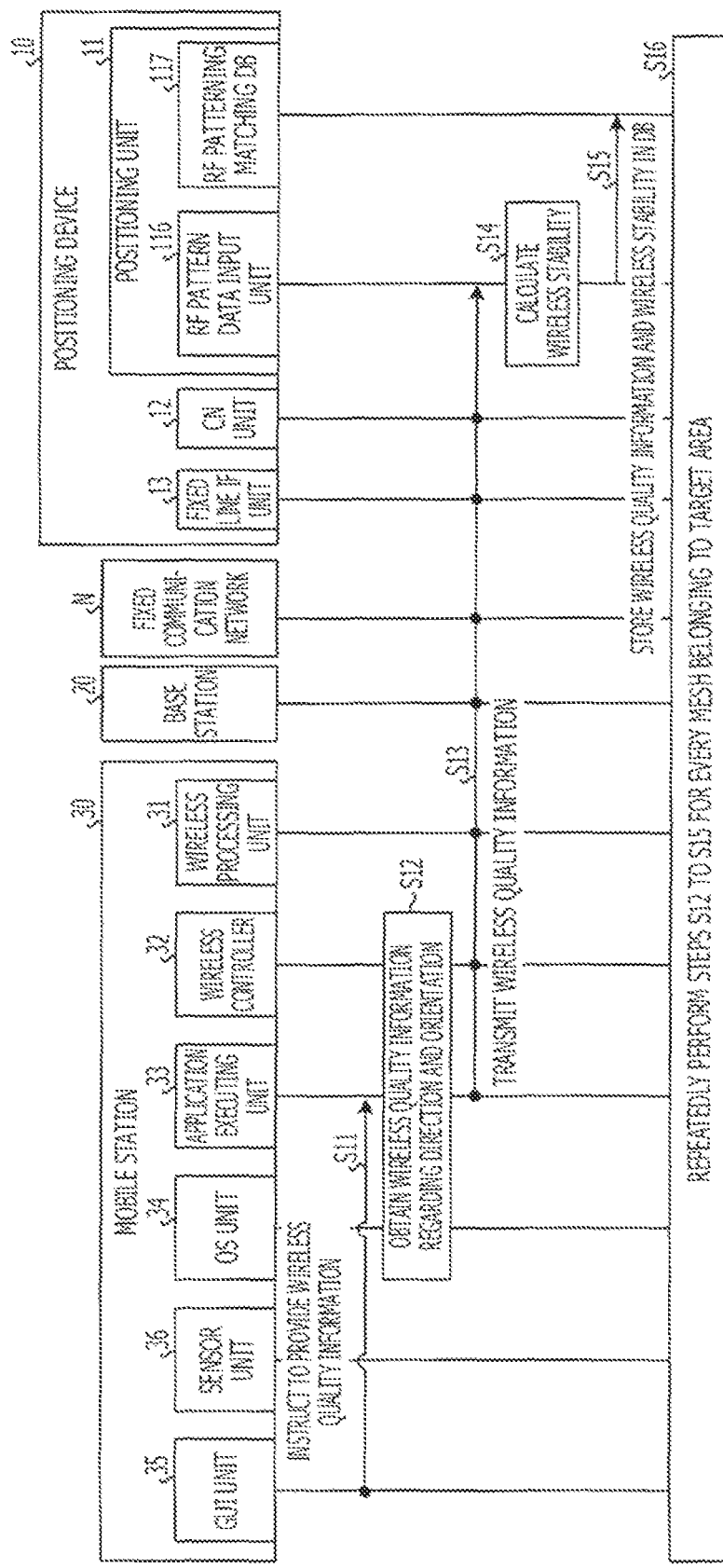
FIG. 4 is a sequence diagram illustrating an operation of generating an RF pattern matching DB.

FIG. 4 is a sequence diagram illustrating an operation of generating a RF pattern matching DB. First, when the user of the mobile station 30 instructs via the GUI unit 35 to provide wireless quality information (S11), the application executing unit 33 obtains wireless quality information regarding the direction and orientation of the mobile station 30 in units of one mesh, which is the minimum positioning unit of a positioning target area (hereinafter, simply referred to as "target area") (S12). Accordingly, a total of twenty-four patterns, e.g., six directions (±X, ±Y and ±Z)×four orientations (north, south, east and west), for example, are obtained for each mesh.

Then, the application executing unit 33 transmits the wireless quality information obtained in operation S12 to the positioning device 10 via the wireless controller 32 and the wireless processing unit 31 (S13). The wireless quality information reaches the positioning device 10 through the base station 20 and the fixed communication network N, and then is input to the RF pattern data input unit 116 through the fixed line IF unit 13 and the CN unit 12. The RF pattern data input unit 116 calculates wireless stability around the mobile station 30 using the input wireless quality information (S14). In addition, the RF pattern data input unit 116 associates the wireless quality information input in operation S13 and the value of wireless stability calculated in operation S14 with a mesh ID, and stores the associated information, values, and mesh ID in the RF pattern matching DB 117 (S15).

The sequential processing in operations S12 to S15 is executed for every mesh belonging to the target area (S16). As a result, for example, twenty-four RF patterns are registered with the RF pattern matching DB 117 for each of a plurality of mesh IDs assigned to meshes (e.g., twenty-five meshes) within the target area in one-to-one correspondence.

Figures 5A, 5B:
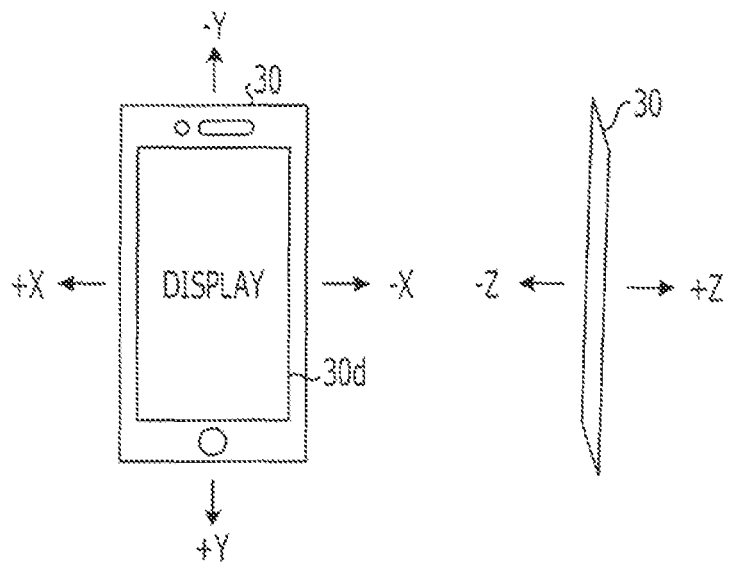
FIG. 5A illustrates directions of a mobile station.
FIG. 5B illustrates corresponding relationships between directions of a mobile station and values of an angular accelerometer.

FIG. 5A illustrates directions of a mobile station. As illustrated in FIG. 5A, in the present embodiment, an X axis is defined as a horizontal direction and a Y axis is defined as a vertical direction when the display 30d of the mobile station, for example, the mobile station 30 illustrated in FIG. 1, faces forward. Also, a Z axis is defined as a depth direction (thickness direction) of the mobile station 30. Further, a state where the mobile station 30 is used by the user in a vertically long posture as illustrated in FIG. 5A will be referred to as a portrait state, and a state where the mobile station 30 is used by the user in a horizontally long posture will be referred to as a landscape state.

FIG. 5B illustrates corresponding relationships between directions of a mobile station and values of an angular accelerometer. As illustrated in FIG. 5B, directions of the mobile station, for example, the mobile station 30 illustrated in FIG. 1, are defined by values of an angular accelerometer. For example, when the mobile station 30 is placed on a desk or the like such that the display thereof faces the sky, only a value in the Z-axis direction, among values of the angular accelerometer, is approximately "−1.00 (gravitational acceleration)" and other values are approximately "0.00". A direction number in this easels specified by "1". Conversely, when the mobile station 30 is placed on a desk or the like such that the display thereof faces the ground, a value in the Z-axis direction, among the values of the angular accelerometer, is approximately "+1.00" and other values are approximately "0.00". A direction number in this case is specified by "2". Similarly, for example, when the mobile station 30 is used such that a right side thereof faces the sky for watching a movie or the like in the landscape state, the value in the X-axis direction, among the values of the angular accelerometer, is approximately "−1.00" and the other values are approximately "0.00". A direction number in this case is specified by "3". In addition, when the mobile station 30 is used such that an upper side thereof faces the sky for internet surfing or the like in the portrait state, the value in the Y-axis direction, among the values of the angular accelerometer, is approximately "−1.00" and the other values are approximately "0.00". A direction number in this case is specified by "5".

FIG. 6 illustrates corresponding relationships between directions and orientations of a mobile station and values of a geomagnetic sensor. As illustrated in FIG. 6, orientations are specified for each direction of the mobile station, for example, the mobile station 30 illustrated in FIG. 1, based on values obtained by the geomagnetic sensor. For example, when a direction number is "1" and a value of the geomagnetic sensor is "0 degrees" in the −Y direction, the mobile station 30 is placed on a desk or the like such that the display thereof faces the sky and an upper side (a top side) thereof faces north. Further, when a direction number is "3" and a value of the geomagnetic sensor is "90 degrees" in the −Z direction, the mobile station 30 is used such that a right side thereof faces the sky in the landscape state and the upper side thereof faces east. Further, when a direction number is "5" and a value of the geomagnetic sensor is "180 degrees" in the −Z direction, the user uses the mobile station 30 such that the upper side thereof faces the sky in the portrait state and also faces south. In this manner, a total of twenty-four RF patterns exist for each mesh according to the combination of the directions and the orientations of the mobile station 30. In addition, dotted portions in FIG. 6 may not be factors for use in determining orientation and may not be considered in specifying the RF patterns for use in positioning.

FIG. 7 illustrates an example of mesh IDs given to a target area. As illustrated in FIG. 7, the target area A1 within a store or the like is divided into a mesh configuration at certain intervals, and mesh IDs a1 to e5 are assigned to respective meshes (divided regions or partitions). One side of each mesh may be appropriately set and changed by an operator according to the area of the target area A1, desired precision of positioning, whether the mobile station 30 is in an indoor environment or the like. However, in terms of implementing positioning with high precision, one side of each mesh may range from 1 m to 10 m (e.g., 5 m). For example, one side of the mesh may be adjusted by the operator to be approximately 10 m if the target area A1 is a large area such as a square, and may be adjusted by the operator to be approximately 1 m if the target area A1 is a small area such as an exhibit ball. Further, although the shapes and areas of the respective meshes are uniform in the example illustrated in FIG. 7, the meshes may have different shapes or areas. Also, the manner in which the mesh IDs are assigned is not limited to the example illustrated in FIG. 7 and mesh IDs may be assigned radially or may be assigned in a three-dimensional (3D) manner when the target area is formed throughout a plurality of floors.

Figure 8:
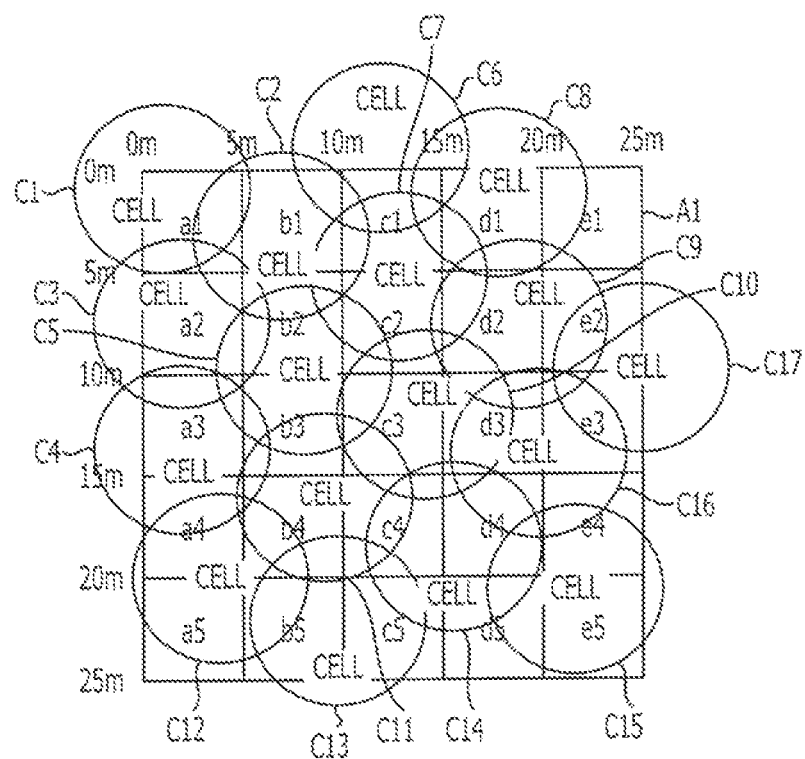
FIG. 8 illustrates an example of cells disposed in a target area.

FIG. 8 illustrates an example of cells disposed in a target area. The respective LTE femto base stations are installed with an interval of about 5 m within the target area A1 and form cells C1 to C17 having a radius of about 10 m. As illustrated in FIG. 8, the respective meshes a1 to e5 are equi-spaced by 5 m within the target area A1. Since the transmission power of the respective LTE femto base stations can reach about tens of meters, the respective cells C1 to C17 are formed within the target area A1 in an overlapping manner and enhance wireless communication quality.

Next, with reference to FIG. 9, the wireless quality information obtained by the application executing unit. 33 of the mobile station 30 in operation S12 of FIG. 4 will be described. FIG. 9 illustrates a format of data provided from a mobile station to a positioning device. The mobile station may be the mobile station 30 illustrated in FIG. 1 and the positioning device may be the positioning device 10 illustrated in FIG. 1. Since the respective base stations correspond to the cells C1 to C17 in a one-to-one, the cell IDs (e.g., C1 to C3) can be used as identification information of the base stations (base station IDs) as illustrated in FIG. 9. As illustrated in FIG. 9, stored in the format F1 of date provided from the mobile station 30 to the positioning device 10 is the wireless quality information of the base station 20 with which the mobile station 30 communicates in every direction and every orientation described above with reference to FIGS. 5B and 6. In the format F1, the wireless quality information regarding the closest base station 20 to the mobile station 30 is first stored, and not only single wireless quality information but also n number of wireless quality information (where n is a natural number) may be stored for each direction and orientation. Also, as for a time at which the wireless quality information to be stored in the format F1 is measured, not only wireless quality information measured at single time t1 but also a multiple number of wireless quality information measured at a plurality number of times (e.g., times t1 to t3) may be stored for each direction and orientation. With this configuration, wireless quality information having high precision can be provided while suppressing an influence of sequential or unexpected change of wireless quality between the mobile station 30 and the base station 20.

In FIG. 9, for example, when the mobile station 30 is placed such that the display thereof faces the sky and faces north in the mesh a1, the mobile station 30 communicates at least with the base station 20 forming the cell C1. Thus, the mobile station 30 obtains wireless quality information of the base station 20 at every certain time. For example, the mobile station 30 obtains "−105 dBm" as wireless quality information of the cell C1 at time t1 and then obtains "−110 dBm" and "−115 dBm" as wireless quality information of the cell C1 at times t2 and t3, respectively. The wireless quality information is collected as base station information B1, stored in the format F1, and then transmitted to the positioning device 10 through the base station 20 and the fixed communication network N, together with other base station information B2 to Bn. In the above, the wireless quality information when the direction number is "1" and the orientation is "north" has been described by way of example, but wireless quality information regarding other directions and orientations is also stored in a similar manner. Further, the mesh ID a1 has been described by way of example, substantially the same format of data is also generated and provided for the other mesh IDs a2 to e5.

Next, wireless stability calculated by the RF pattern data input unit 116 of the positioning device 10 in the operation S14 of FIG. 4 will be described with reference to FIG. 10. The RF pattern data input unit 116 of the positioning device 10 calculates wireless stability based on the wireless quality information provided from the mobile station 30. For example, since wireless stability decreases as a standard deviation of the wireless quality information at times t1 to t3 increases, the positioning device 10 may use the standard deviation as an indicator of wireless stability. FIG. 10 illustrates average values of wireless quality information of data provided from a mobile station to the positioning device and wireless stability. The mobile station may be the mobile station 30 illustrated in FIG. 1 and the positioning device may be the positioning device 10 illustrated in FIG. 1. For example, when the direction number is "1" and the orientation is "north", the wireless quality information of the cell C1 at times t1 to t3 is "−105 dBm", "−110 dBm" and "−115 dBm", respectively (see FIG. 9). Thus, as illustrated in FIG. 10, an average value of the wireless quality information is calculated as "−110 dBm" ((−105−110−115)/3 dBm). Further, a standard deviation as wireless stability is calculated as, for example, "5".

Next, the RF pattern R1 stored in the RF pattern matching DB 117 of the positioning device 10 in the operation S15 of FIG. 4 will be described with reference to FIG. 11. FIG. 11 illustrates a RF pattern stored in a RF pattern matching DB of a positioning device. The RF pattern matching DB may be the RF pattern matching DB 117 illustrated in FIG. 1. As illustrated in FIG. 11, the average values of the wireless quality information provided from the mobile station 30 and wireless stability are associated with the mesh IDs and the average values and the wireless stability are stored in the RF pattern matching DB 117 in such a manner that they can be updated. In FIG. 11, only the wireless quality information having the mesh ID of "a1" and the direction number of "1" is illustrated for the sake of convenience. However, wireless quality information associated with all the direction numbers 1 to 6 of all the mesh IDs a1 to e5 constituting the target area A1 may be scored in the RF pattern matching DB 117. Accordingly, no matter where the mobile station 30 is located in the target area A1, the positioning device 10 may specify an RF pattern to be used based on the direction and orientation of the mobile station 30 and may estimate a current location of the mobile station 30 by using the wireless quality information of the RF pattern.

Next, a positioning process executed after the creation of the RF pattern matching DB 117 is completed will be described.

Figure 12:
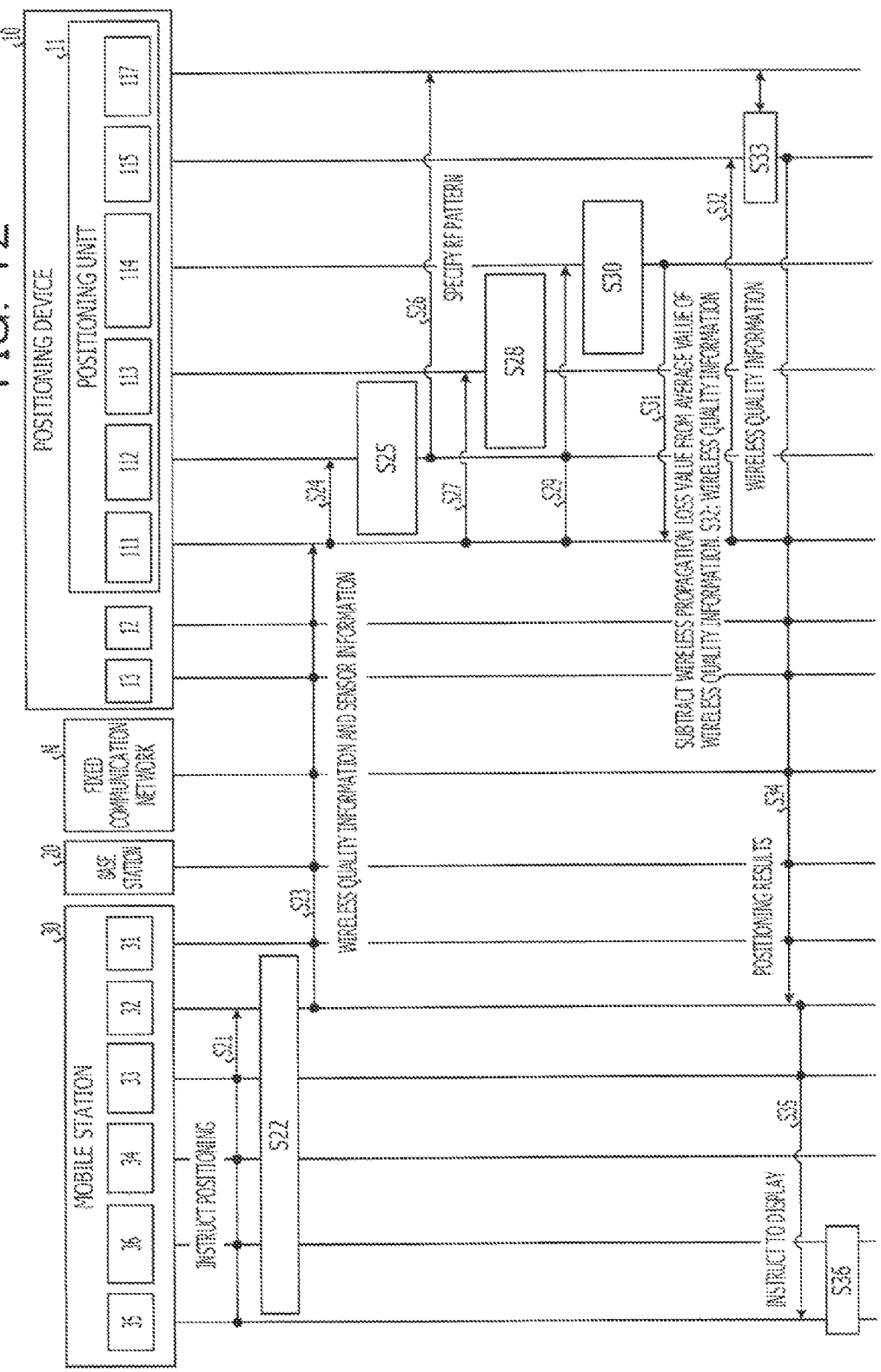
FIG. 12 is a sequence diagram illustrating an operation of measuring a location of a mobile station.

FIG. 12 is a sequence diagram illustrating an operation of measuring a location of a mobile station. First, when the user of the mobile station, for example, the mobile station 30 illustrated in FIG. 1, instructs the mobile station 30 to start measurement of a current location thereof via the GUI unit 35 (S21), the application executing unit 33 starts a positioning program. According to the positioning program, the application executing unit 33 collects wireless quality information corresponding to a direction and orientation of the mobile station 30 and sensor information detected from respective sensors such as an angular accelerometer, a geomagnetic sensor, a proximity sensor and an illumination sensor, by using a standard API of the OS unit 34 (S22).

FIG. 13 illustrates a format F3 of data collected by a mobile station at a start of positioning. As illustrated in FIG. 13, stored in the format F3 are wireless quality information of the mobile station, for example, the mobile station 30 illustrated in FIG. 1, having a mobile station ID "001" and sensor information at every time t1 to t3. For example, RSRP values in the cell C1 of "−105 dBm", "−110 dBm" and "−115 dBm" at times t1 to t3, respectively, are stored as the wireless quality information. Similarly, the RSRP values at times t1 to t3 in other cells C2 and C3 in which the mobile station 30 is located are also stored in the format F3. Further, angular accelerometer values in 3-axis (Z, X, and Y axes) directions at times t1 to t3 and geomagnetic sensor values in 3-axis (Y, X, and Z axes) directions at times t1 to t3 are stored in the format F3. Furthermore, "None" indicating a state where there is no adjacent object around the mobile station 30, as a value of the proximity sensor, and "bright" indicating a state where the intensity of illumination is equal to or higher than a certain value, as a value of the illumination sensor, are set at every time t1 to t3 in the format F3.

Referring back to FIG. 12, after being collected for a certain period of time, the collected data is provided to the positioning device 10 (S23). For example, the wireless controller 32 transmits the wireless quality information obtained in the operation S22 together with the sensor information, to the positioning device 10 via the wireless processing unit 31. The wireless quality information and the sensor information reach the positioning device 10 through the base station 20 and the fixed communication network N, and is input to the location-related information transceiver unit 111 through the fixed line IF unit 13 and the CN unit 12.

When the location-related information transceiver unit 111 outputs the wireless quality information and the sensor information to the direction/orientation determining unit 112 (S24), the direction/orientation determining unit 112 determines a direction and orientation of the mobile station 30 based on the respective values of the angular acceleration sensor and the geomagnetic sensor included in the sensor information (S25). FIG. 14 illustrates a format of collected data after directions and orientations of a mobile station are determined. The mobile station may be the mobile station 30 illustrated in FIG. 1. As illustrated in FIG. 14, in the format F4, "Direction No. 1: Display faces the sky" is additionally set as a "direction" corresponding to the angular accelerometer value in the format F3. Also, in the format F4, "north" is added as "orientation" corresponding to the geomagnetic sensor value in the format F3. Referring back to FIG. 12, the direction/orientation determining unit 112 specifies an RF pattern to be used for positioning the mobile station 30, among the RF patterns stored in the RF pattern matching DB 117, based on the determination results in the operation step S25 (S36).

Figure 15:
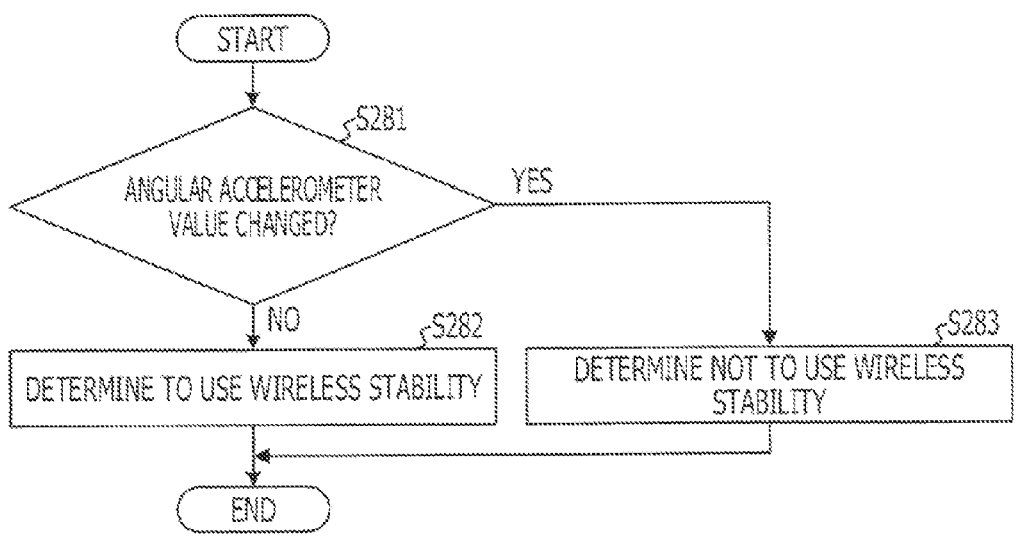
FIG. 15 is a flow chart illustrating a determination process executed by a positioning device to determine whether wireless stability is required to be used.

The location-related information transceiver unit 111 outputs the wireless quality information and the angular accelerometer value to the wireless stability determining unit 113 (S27). The wireless stability determining unit 113 determines whether to use wireless stability in positioning the mobile station 30 based on variations of the wireless quality information and the angular accelerometer value (S28). FIG. 15 is a flow chart illustrating a determination process executed by a positioning device 10 to determine whether wireless stability is required to be used. The positioning device may be the positioning device illustrated in FIG. 1. As illustrated in FIG. 15, the wireless stability determining unit 113 determines whether the angular accelerometer value received in the operation S27 is changed at each time t1 to t3 (S281). When it is determined that the angular accelerometer value is not changed ("No" in S281), the wireless stability determining unit 113 determines to use wireless stability and calculates an average value and a standard deviation of wireless quality information at times t1 to t3 (S282). Meanwhile, when it is determined that he angular accelerometer value is changed ("Yes" in S281), the wireless stability determining unit 113 determines not to use wireless stability in positioning the mobile station 30 and calculates an average value of the wireless quality information at times t1 to t3 (S283).

FIG. 16 illustrates a format of collected data after a determination process to determine whether a wireless stability is required to be used is executed. In the format F5, the angular accelerometer value is not changed over times t1 to t3 (i.e., the angular accelerometer value is "−1.00" at any time t1 to t3), the wireless quality information is changed at every time t1 to t3 and "5 (use)" is additionally set as "wireless stability" as illustrated in FIG. 16. In addition, "−110 dBm" is added as an "average value of wireless quality information" in the format F5.

Referring back to FIG. 12, the location-related information transceiver unit 111 outputs the direction determined by the direction/orientation determining unit 112 in the operation S25 and respective values of the angular accelerometer, the proximity sensor and the illumination sensor to the situation determining unit 114 (S29). The situation determining unit 114 determines a situation on which the mobile station 30 is placed, based on the direction and the values of the respective sensors (S30). The situation determining unit 114 subtracts a wireless propagation loss value set for the situation determined in the operation S30 from the average value of the wireless quality information (S31).

FIG. 17 illustrates an example of storing data to be referred to when determining a situation of a mobile station in a table. As illustrated in FIG. 17, in the table T3, the direction number of the mobile station 30, the values of the angular accelerometer, the proximity sensor and the illumination sensor, and the wireless propagation loss value are stored for each situation number. In FIG. 17, when the value of the angular accelerometer is "not 0", it indicates that the mobile station 30 is in motion, and when the value of the angular accelerometer is "0", it indicates that the mobile station 30 is motionless (stationary). For example, when the user is on the phone, the mobile station 30 is generally used in the portrait state and in motion according to user's movement, and further there is an adjacent object such as the user's fingers, mouth or ear. For this reason, "5" as a "direction number", "not 0" as a value of the "angular accelerometer", "presence" as a value of the "proximity sensor", and "bright or dark" as a value of the "illumination sensor" are respectively associated with the situation number "1" indicating a situation that the "user is on the phone". Also, while the user is on the phone, there is a high possibility that a shielding object (e.g., the user's hand or face) or fluctuation may exist in the wireless line between the mobile station 30 end the base station 20, and thus the wireless propagation loss is expected to be relatively high. Thus, in the table T3, "10 dB" is set as a "wireless propagation loss value" for the situation number "1".

Similarly, for example, when the user places the mobile station 30 on a desk such that it faces upwardly, the mobile station 30 is generally motionless and there is a high possibility that no adjacent object exists near the mobile station 30. For this reason, "1" as a "direction number", "0" as a value of the "angular accelerometer", "absence" as a value of the "proximity sensor" and "bright" as a value of the "illumination sensor" are respectively assigned to the situation number "3". Further, when the mobile station 30 is placed on a desk, the desk or any other object may act as an obstacle to the wireless line, but in most cases, it is expected that a possibility that a wireless propagation loss occurs is low. Thus, in the table T3, "0 dB" is set as a "wireless propagation loss value" for the situation number "3".

Similarly, for example, when the user puts the mobile station 30 in a bag, the mobile station 30 is generally received in the bag in the landscape state (a state where the mobile station 30 is laid down laterally), further, the mobile station 30 is in motion according to movement of the bag and the bag becomes an adjacent object. For this reason, "3 or 4" as a "direction number", "not 0" as a value of the "angular accelerometer", "presence" as a value of the "proximity sensor" and "dark" as a value of the "illumination sensor" are respectively assigned to the situation number "5" indicating "in bag". Also, since the bag shields the mobile station 30 when the mobile station 30 is in the bag, it is expected that there is a high possibility that a wireless connection between the mobile station 30 and the base station 20 is almost completely blocked and thus a wireless propagation loss is high. Thus, in the table T3, the maximum wireless propagation loss of "15 dB" is set as a "wireless propagation loss value" for the situation number "5".

FIG. 18 illustrates a format of collected data after determining a situation. In the format F6 as illustrated in FIG. 18, since "1" is stored as a "direction number" and the angular accelerometer values in the Z-axis direction indicating a direction of acceleration of gravity is "−1.00" at any time t2 to t3, it is anticipated that the mobile station 30 is motionless. For this reason, the situation number of the mobile station 30 is determined to be "3" which has a direction number of "1" and the angular accelerometer value of "0", among the situation numbers "1" to "6" stored in the table T3 (see FIG. 17). Thus, "3" is set in the "situation number" field in the format F6.

In the present embodiment, since a wireless propagation loss value corresponding to the situation number "3" is "0 dB", the average value "−110 dBm" of the wireless quality information is used as it is, without being subtracted (see FIG. 18). However, for example, when the wireless propagation loss value is "10 dB", "10 dB" is subtracted from the average value of the wireless quality information. As a result, the average value of the wireless quality information is updated from "−110 dBm" to "−120 dBm" in the format F6.

Referring back to FIG. 12, the location-related information transceiver unit ill of the positioning device 10 outputs the wireless quality information of the mobile station 30, which has been input from the situation determining unit 114 in the operation S31, to the positioning executing unit 115 (S32). Upon receiving the wireless quality information, the positioning executing unit 115 executes a positioning process (S33). That is, the positioning executing unit 115 checks the wireless quality information pre-registered with the RF pattern matching DB 117 and the wireless quality information received in step S32 to specify a mesh ID minimizing an error.

FIG. 19 illustrates an RF pattern as a matching target with wireless quality information of a mobile station. As illustrated in FIG. 19, at the time of the operation S33 in FIG. 12, twenty-four RF patterns in every mesh ID are filtered to an RF pattern having a direction number of "1" and an orientation of "north" through the processing in the operations S24 to S32. Thus, the positioning executing unit 115 may search for, as a matching target, the wireless quality information corresponding to the filtered RF pattern in positioning the mobile station 30. The positioning executing unit 115 may search for only the wireless quality information as a matching target.

Referring back to FIG. 12, in the foregoing operation S33, the positioning executing unit 115 may use a least square method, for example, as a method for matching the RF pattern. The least square method is a method for obtaining an approximated curve to a measurement value. Since the least square method is a commonly used method, a detailed description thereof will be omitted. When a value of wireless quality information in the RF pattern matching DB 117 is $S_{n,x,y}$ and a measurement value of wireless quality information by the mobile station 30 is $R_n$, a square error $E(\Phi)$ is represented by Equation (1) below. In Equation (1), n is a natural number ranging from "1" to "N" indicating an identification number of the base station information. Further, x and y correspond to a mesh ID. For example, when the mesh ID is "a1", x=1 and y=1, and when the mesh ID is "a2", x=1 and y=2. Further, when the mesh ID is "b1", x=2 and y=1, and when the mesh ID is "b2", x=2 and y=2.

$$E(\varphi) = \sum_{n=1}^{N} (S_{n,x,y} - R_n)^2 \qquad \text{Equation (1)}$$

In the present embodiment, wireless quality information of the mesh ID "a1" is substantially equal to the wireless quality information measured by the mobile station 30. Thus, in case of x'y=1, a value of the square error $E(\phi)$ is "0", which may be the minimum value. As a result, the positioning executing unit 115 obtains the mesh ID "a1" as positioning results.

Figure 20:
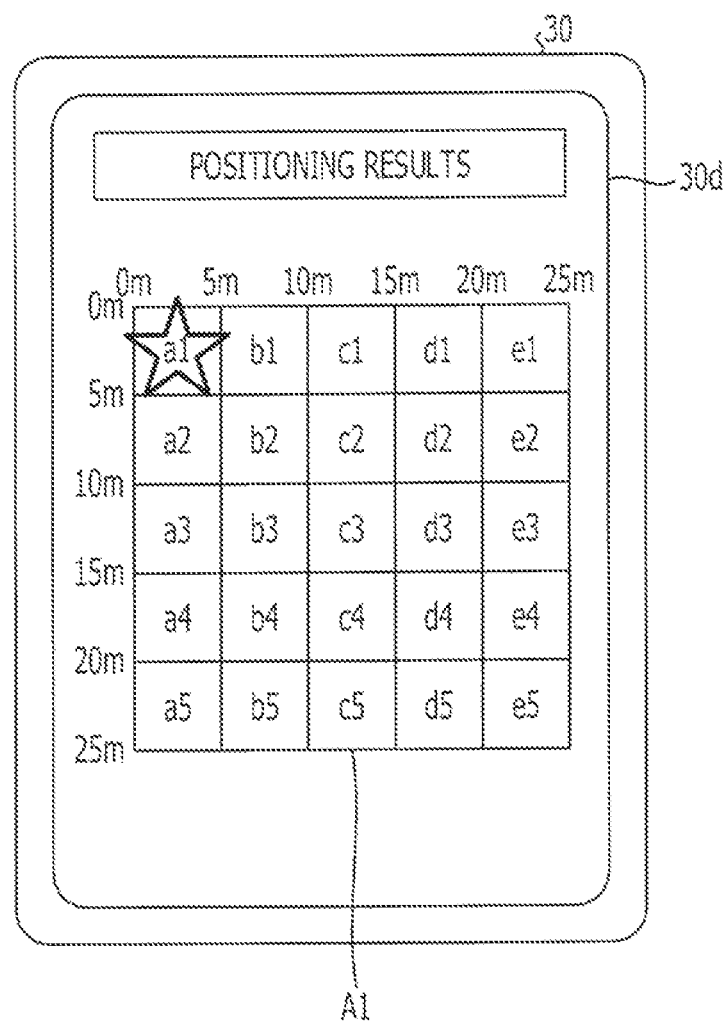
FIG. 20 illustrates a positioning result displayed on a display of a mobile station.

The positioning executing unit 115 instructs the location-related information transceiver unit 111 to transmit the positioning results (S34). The location-related information transceiver unit 111 transmits the positioning results to the mobile station 30 through the fixed communication network N and the base station 20 by means of the CN unit 12 and the fixed line IF unit 13. The wireless controller 32 of the mobile station 30 outputs the received positioning results to the application executing unit 33. The application executing unit 33 instructs the GUI unit 35 to display the positioning results (S35). The GUI unit 35 displays the positioning results on the display 30d (S36). FIG. 20 illustrates a positioning result displayed on a display of a mobile station. In the present embodiment, the mobile station 30 is located in a position of the mesh ID "a1" within the target area A1. Thus, as illustrated in FIG. 20, "a1" indicating the location of the mobile station 30 is emphatically displayed on the display 30d.

Here, it can be assumed that a plurality of positioning results exist and the positioning device 10 cannot narrow the location of the mobile station 30 into one of the positioning results, because, for example, a plurality of mesh IDs have the same square error calculated based on the least square method. In this case, the positioning executing unit 115 narrows the plurality of mesh IDs into a mesh ID having wireless stability (standard deviation) other than "0". Referring back to FIG. 19, the directions and the orientations of the mesh IDs "a1" and "e5" are the same. In this case, if the mesh IDs "a1" and "e5" are selected as candidates of the positioning results to being notified to the mobile station 30 and a value of wireless stability corresponding to the mesh IDs "a1" and "e5" are "5" and "0", respectively, the mesh ID "a1" is selected as a notification target to be provided to the mobile station 30 because a value of wireless stability corresponding to the mesh ID "a1" is other than "0". The location-related information transceiver unit 111 sends the selected mesh ID "a1" back to the mobile station 30, as positioning results of the current location of the mobile station 30.

Further, although the mesh IDs are narrowed as mentioned above, if a plurality of mesh IDs having wireless stability with a value other than "0" exist, the positioning device 10 may send the plurality of mesh IDs back to the mobile station 30. In this case, the plurality of mesh IDs (e.g., a1 and b2) are emphatically displayed as positioning results on the display 30d of the mobile station 30.

As described above, the positioning device 10 according to the present embodiment includes the location-related information transceiver unit 111, the direction/orientation determining unit 112 and the positioning executing unit 115. The location-related information transceiver unit 111 receives wireless quality information indicating wireless quality between the mobile station 30 and the base station 20 and information indicating a direction and orientation of the mobile station 30. The direction/orientation determining unit 112 determines data to be used for measuring a location of the mobile station 30 based on the direction and orientation, among data (e.g., the RF patterns) in which regions (e.g., meshes) as location candidates of the mobile station 30 are set being associated with the wireless quality information. The positioning executing unit 115 measures a location of the mobile station 30 based on the wireless quality information, with reference to the data determined by the direction/orientation determining unit 112.

Further, in the positioning device 10, the positioning executing unit 115 may estimate a location corresponding to wireless quality information most similar to the wireless quality information transmitted from the mobile station 30, among a plurality of wireless quality information set being associated with the regions in the aforementioned data, as a current location of the mobile station 30. Accordingly, the location of the mobile station 30 measured by the positioning device 10 reflects changes in wireless quality information based on the direction and orientation of the mobile station 30. As a result, the location of the mobile station 30 may be accurately measured.

Further, in the positioning device 10, the location-related information transceiver unit 111 may receive the wireless quality information and information indicating the presence or absence of an adjacent object with respect to the mobile station 30, and the positioning executing unit 115 may measure a location of the mobile station 30 based on the wireless quality information and the presence and absence of the adjacent object. Also, in the positioning device 10, the location-related information transceiver unit 111 may receive the wireless quality information measured at a plurality of points in time. The positioning executing unit 115 may calculate stability (e.g., fluctuation) of wireless quality between the mobile station 30 and the base station 20 by using the wireless quality information measured at the plurality of points in time, and measure the location of the mobile station 30 based on the wireless quality information and the stability. Accordingly, the surrounding situation or wireless propagation state of the mobile station 30 may be reflected in the positioning results, thereby allowing for measuring the location of the mobile station 30 with higher precision.

Further, in the foregoing embodiment, when determining the situation number (see FIG. 17), the positioning device 10 determines the situation number based on the presence or absence of an adjacent object or whether or not the mobile station 30 is in contact with an adjacent object. However, without being limited thereto, the positioning device 10 may determine the situation number in consideration of a distance between the mobile station 30 and the adjacent object. For example, even though other conditions (the direction number, the angular accelerometer value and the like) are the same, it is supposed that a wireless propagation loss value will increase as the distance between the mobile station 30 and the adjacent object decreases, and conversely, will decrease as the distance increases. Thus, the positioning device 10 may set situations more minutely by appropriately changing the wireless propagation loss value set in the situation determining table T3 according to the distance between the mobile station 30 and the adjacent object. As a result, the location of the mobile station 30 may be more accurately measured by reflecting the surrounding environment of the mobile station 30.

Also, in the foregoing embodiment, when determining the situation number (see FIG. 17), the positioning device 10 determines the situation number based on whether the perimeter of the mobile station 30 is bright or dark. However, without being limited to thereto, the positioning device 10 may determine the situation number in consideration of illumination or luminance as indicators of brightness. For example, even though other conditions (the direction number, the angular accelerometer value and the like) are the same, it is assumed that a wireless propagation loss value will decrease as the perimeter of the mobile station 30 is brighter, because it is likely that there are fewer shielding objects such as a bag or a pocket if the perimeter of the mobile station 30 is bright. Conversely, it is assumed that a wireless propagation loss value will increase as the perimeter of the mobile station 30 is darker, because shielding characteristics with respect to the mobile station 30 is likely to be high if the perimeter of the mobile station 30 is dark. Thus, the positioning device 10 may cope with a high number of subdivided situations by appropriately changing the wireless propagation loss value set in the situation determining table T3, according to the illumination or luminance. As a result, the location of the mobile station 30 may be more accurately measured by reflecting the environment on which the mobile station 30 is placed.

In the foregoing embodiment, LTE standardized by the 3GPP was employed as an air interface for illustration, but the positioning system 1 may also be applicable to W-CDMA. In W-CDMA, the positioning system 1 may cope with the foregoing positioning technique by using Received Signal Code Power (RSCP) and Common Pilot Channel Energy per chip to Noise ratio (CPICH_Ec/No) as wireless quality information replacing RSRP and RSRQ, respectively. Further, in the foregoing embodiment, a smart phone having various sensors mounted therein was employed as the mobile station 30 for illustration. However, without being limited thereto, the present disclosure may also be applicable to various communication devices capable of measuring wireless quality information such as cellular phones and personal digital assistant (PDA).

In addition, the physical configuration of the respective components of the positioning device 10 may not be limited to the configuration illustrated in FIG. 1. For example, specific aspects of distribution and/or integration of the respective components are not limited to those illustrated in FIG. 1, but may be configured such that all or some of the components are functionally or physically distributed and/or integrated by units according to various loads, usage situations or the like. For example, the wireless stability determining unit 113 and the situation determining unit 114, or the RF pattern data input unit 116 and the RF pattern matching DB 117 may be integrated as a single component, respectively. Conversely, regarding the location-related information transceiver unit 111, it may be divided into a portion for receiving information to be used for positioning such as the wireless quality information and a portion for transmitting positioning results to the mobile station 30. Regarding the RF pattern data input unit 116, it may be divided into a portion for calculating wireless stability and a portion for associating wireless stability with a mesh ID and registering the same in the RF pattern matching DB 117. Further, the memories 10c and 30c may be provided as external devices of the positioning device 10 and the MS 30 by way of a network or a cable, respectively.

According to one aspect of the positioning device disclosed in the present disclosure, it is possible to measure a location of a mobile station with a high degree of precision.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A positioning device, comprising:
a processor configured to execute a positioning program;
and a memory configured to store the positioning program, wherein the processor, based on the positioning program, performs operations to:
receive wireless quality information indicating wireless quality between a mobile station and a base station and information indicating a direction and an angular accelerometer value of the mobile station, wherein the wireless quality information is measured at a plurality of points in time;

acquire measuring data to be used for measuring a location of the mobile station based on the direction and the orientation, from data in which each of regions as location candidates of the mobile station is associated with respective wireless qualify information;

measure the location of the mobile station based on the wireless quality information and the measuring data;

calculate a stability of wireless quality between the mobile station and the base station by using the wireless quality information measured at the plurality of points in time;

determine whether to use the stability for measuring the location of the mobile station based on the angular accelerometer value;

and measure the location of the mobile station based on the wireless quality information and the stability of wireless quality in response to determining to use the stability.

2. The positioning device of claim 1, wherein the processor estimates a location corresponding to wireless quality information which is included in the data and is closest to the wireless quality information transmitted from the mobile station as the location of the mobile station.

3. The positioning device of claim 1, wherein the processor receiving unit receives information indicating presence or absence of an adjacent object to the mobile station, and wherein the processor measures the location of the mobile station based on the wireless quality information and the information indicating the presence or absence of the adjacent object.

4. The positioning device of claim 1, wherein the direction indicates a use state of the mobile station and the orientation indicates a direction which the mobile station faces.

5. A positioning method for use in a positioning device, the method comprising:

receiving wireless quality information indicating wireless quality between a mobile station and a base station and information indicating a direction and an angular accelerometer value of the mobile station, wherein the wireless quality information is measured at a plurality of points in time;

acquiring measuring data to be used for measuring a location of the mobile station based on the direction and the orientation, from among data in which each of regions as location candidates of the mobile station are associated with the wireless quality information;

measuring the current location of the mobile station based on the wireless quality information and the measuring data;

calculating a stability of wireless quality between the mobile station and the base station by using the wireless quality information measured at the plurality of points in time;

determining whether to use the stability for measuring the location of the mobile station based on the angular accelerometer value;

and measuring the location of the mobile station based on the wireless quality information and the stability of wireless quality in response to determining to use the stability.

6. The positioning method of claim 5, further comprising, estimating a location corresponding to wireless quality information which is included in the data and is closest to the wireless quality information transmitted from the mobile station as the location of the mobile station.

7. The positioning method of claim 5, further comprising:

receiving information indicating presence or absence of an adjacent object to the mobile station; and measuring the location of the mobile station based on the wireless quality information and the information indicating the presence or absence of the adjacent object.

8. The positioning method of claim 5, wherein the direction indicates a use state of the mobile station and the orientation indicates a direction which the mobile station faces.

* * * * *